Aug. 9, 1966　　　　　E. J. BAKER　　　　　3,265,895
DEVICE FOR DETECTING AND MEASURING HIGH ENERGY PARTICLES
OF A PREDETERMINED ENERGY LEVEL
Filed June 8, 1965　　　　　　　　　　　　　2 Sheets-Sheet 1

INVENTOR,
EDWARD J. BAKER.

BY: Harry M. Saragovitz,
Edward J. Kelly,
Herbert Berl &
Julian C. Keppler
ATTORNEYS.

Aug. 9, 1966 E. J. BAKER 3,265,895
DEVICE FOR DETECTING AND MEASURING HIGH ENERGY PARTICLES
OF A PREDETERMINED ENERGY LEVEL
Filed June 8, 1965 2 Sheets-Sheet 2

INVENTOR,
EDWARD J. BAKER.

BY Harry M. Saragovitz,
Edward J. Kelly,
Herbert Berl &
Julian C. Keppler ATTORNEYS.

United States Patent Office 3,265,895
Patented August 9, 1966

3,265,895
DEVICE FOR DETECTING AND MEASURING HIGH ENERGY PARTICLES OF A PREDETERMINED ENERGY LEVEL
Edward J. Baker, Oakhurst, N.J., assignor to the United States of America as represented by the Secretary of the Army
Filed June 8, 1965, Ser. No. 462,459
7 Claims. (Cl. 250—83.3)

The invention described herein may be manufactured and used by or for the Government for governmental purposes, without the payment of any royalty thereon.

This application is a continuation-in-part of my U.S. patent application Serial Number 283,117 filed May 24, 1963 for Radiation Detection and Measuring Apparatus, now abandoned.

This invention relates to a detection device capable of detecting the presence of particles of a preselected energy level in a radiation environment to which the device is exposed.

The device of the invention, unlike previous devices for detection of particles, is able to detect particles of extremely high energy.

Particles of high energy, such as neutrons, protons, electrons, and gamma rays are present in nuclear environments. Some means must be had for selectively determining the presence of such particles in terms of their energy level. The device of the invention includes a substantially cylindrical casing made up of two spaced discoidal end walls and an arcuate peripheral wall disposed between the end walls. The casing thus bounds a cylindrical chamber. A resonator structure is disposed within this chamber and is provided with several angularly disposed cavity resonators each having radial slot opening outwardly into the chamber. At least one of the cavity resonators is provided with an output loop for coupling energy developed by the resonator structure to a spectrum analyzer or other type of indicator. A window is provided in the peripheral wall of the casing which is made of a material capable of partially stopping the high energy particles to be detected to a desired energy level. The casing is evacuated and is supported between the poles of a powerful magnet which produces a magnetic field perpendicular to the end walls of said casing; this magnetic field is uniform throughout a region substantially coextensive with the resonator structure. In some applications, the resonator structure is considerably smaller than the chamber; in this event, the strength of the magnetic field must be progressively increased from the periphery of the casing to the region of uniform field in the region of the resonator structure in order to permit the electrons emanating from the window to spiral inwardly into the region adjacent the periphery of resonator structure. Some of the particles in the aforesaid environment impinge upon the outer face of the window, which window, when exposed to incident particles of a particular type from the radiation environment, transmit a portion of the associated energy therethrough. The type of window used will depend, in part, upon the type of particles to be detected. For example, the bombardment of certain window materials by neutrons will result in formation of electrons at the opposite face of the window, while other window materials will cause protons to emanate from the window in response to neutron bombardment. In some instances, high energy electrons present in the radiation environment can be detected; these electrons impinging upon the window material will pass through said window. The electrons passing through the window will emanate from the opposite face of the window with reduced energy; the amount of reduction in energy will depend upon the thickness of the window material and upon the kind of window material. The exact relationship between the energy of the charged particles emanating from the window and the initial energy level of the particles impinging upon said window can be established by proper choice of material of the window and upon the window thickness.

The particles emanating from the window are directed by means of a transverse magnetic field to the region of uniform magnetic field. By virtue of the uniform magnetic field, the particles are permitted to orbit about the periphery of the resonator structure along a circular path concentric with and very close to said periphery. When charged particles of the proper energy level and, consequently, of corresponding proper velocity, pass by the slots in the resonator structure, a high frequeny electrical field is produced on the resonator structure which is synchronized with the velocity of those of the orbiting particles having said proper velocity. As is well known in the art, when this synchronization attains, the particles excite the individual resonator cavities into oscillation at their resonant frequency and the resonator structure generates energy at its resonant frequency. The presence of such oscillatory energy is sensed by the coupling loop and indicator. When the resonator structure generates energy, therefore, an indication is provided of the presence of particles of a velocity associated with a given energy level within the chamber and, since the stopping power of the window is known, an indication is provided of the presence of incident particles from the aforesaid radiation environment of the preselected energy level.

It is well known that a typical radiation environment includes such charged particles as electrons and protons, as well as neutrons and gamma rays. It will be assumed, for the purpose of explanation, that it is desired to determine the presence of electrons from this environment which have a particular energy level $E_n$. These electrons impinge upon the aforesaid window and after passage through said window, emerge with some energy level $E_p$ which is lower than $E_n$; the electrons then enter the evacuated chamber. The energy level $E_p$ will bear a fixed determinable relationship to the energy $E_n$ of the incident particle; this relationship will depend upon the type of material and the thickness of the material chosen for the window. More specifically, the energy $E_p$ of the charged particles emanating from the window and entering the chamber will be related to the energy $E_n$ of the incident particles by the stopping power of the window.

For the sake of explanation, it will be assumed that it is desired to detect electrons of 4 mev. energy level and that, after exposure to a copper window one quarter centimeter thick, the electrons emanate with an energy of 28.5 kev. Since the energy equivalent of one electron volt is $1.60 \times 10^{-12}$ erg, this assumed energy level $E_p$ is $4.55 \times 10^{-8}$ erg.

Now, the energy of an orbiting particle is given by $$E_p = \tfrac{1}{2} m v^2$$

where $m$ is the mass of the charged particle and $v$ is its velocity. The velocity then is given by $$v = \sqrt{\frac{2E_p}{m}}$$

from which $$v = \sqrt{\frac{2(4.55 \times 10^{-8})}{9.11 \times 10^{-28}}} = \sqrt{.997 \times 10^{20}} = 1.00 \times 10^{10} \text{cm./sec.}$$

It is known that, if a charged particle of velocity $v$ emanating from the window is directed into a uniform magnetic field, it will be subjected to a constant force normal to the direction of motion. This force $f_m$ is given by equation $f_m = Hev$ where H is the strength of the magnetic field, $e$ is the charge of the particle ($4.80 \times 10^{-10}$ e.s.u.), and $v$ is the aforesaid velocity. This force is equivalent to the centrifugal force necessary to keep a particle in a circular path; this centrifugal force is given by $$f = \frac{mv^2}{r}$$

where $m$ is the mass of the particle ($9.11 \times 10^{-28}$ grams), and $r$ is the radius of the path in centimeters.

From the above equations, one can write the following equation $$Hev = \frac{mv^2}{r}$$

To convert $e$ from electrostatic units to electromagnetic units, it is necessary to use the conversion factor $c$ (the velocity of light). The relationship then attaining is $$\frac{Hve}{c} = \frac{mv^2}{r}$$

One can select the value of $r$ to be equal to one centimeter. This value approximates the radius of the resonator structure, since the particles will be directed so as to orbit very close to the periphery of said resonator structure in order to obtain substantial interaction. The necessary field strength H, for a selected value of velocity $v$, which from the above calculations, is $1.0 \times 10^{10}$ centimeters per second, can be calculated from the equation $$H = \frac{mvc}{er}$$

from which $$H = \frac{(9.11 \times 10^{-28})(1 \times 10^{10})(3 \times 10^{10})}{(4.80 \times 10^{-10})1}$$

or $H = 5.7 \times 10^2 = 570$ gauss.

Now, it is necessary to design an $n$-cavity resonator structure such that, for the pi mode of operation (the most efficient mode), the radio frequency field undergoes one cycle of change during the interval necessary for the particle to traverse $4\pi/n$ radians, where $n$ is the number of cavity resonators. If it be assumed that there are 12 cavity resonators in the resonator structure, the radio frequency field must undergo one cycle of variation during the time the particle travels across 2 cavities angularly displaced by an angle $$\theta = \frac{\pi}{3}$$

radians. The angular velocity $\omega$ of a particle moving along a circular path is given by $$\omega = \frac{\theta}{t}$$

where $t$ is the time in seconds and $\theta$ is the angular distance traversed by the particle in time $t$.

In this particular case, $$\theta = \frac{\pi}{3}$$

$$r = 1, \text{ and } v = 1.0 \times 10^{10} = \omega$$

whereupon $$\omega = \frac{\pi}{3} \cdot \frac{1}{t} = \frac{\pi}{3t}$$

Solving for $t$, $$t = \frac{\pi}{3\omega} = \frac{\pi}{3 \times 1 \times 10^{10}} = 1.047 \times 10^{-10} = \text{seconds}$$

Since frequency is the reciprocal of time $$f = \frac{1}{t} = \frac{1}{1.047 \times 10^{-10}} = 0.955 \times 10^{10} = 9550 \text{ mc.}$$

In order to sense electrons with energy level $E_n = 4$ mev.; the resonator structure must be designed, therefore, to have a fundamental resonant frequency of 9550 megacycles.

Since substantial interchange of energy between the charged particles and the RF field occurs only when synchronism exists between the velocity of the charged particles and the time for one cycle of RF field variation, only particles within the chamber whose energy level is 28 kev., corresponding to a velocity of $1.0 \times 10$ cm./sec., will produce a substantial output from the resonator structure of 9550 mc. resonant frequency. Although some interaction occurs between particles traveling at velocities corresponding to multiples of the fundamental or pi mode frequency, this interaction is relatively small and can be sensed readily in the usual indicating equipment.

For a given magnetic field strength, it is now evident that by proper design of the window material and thickness, as well as the radius and resonant frequency of the resonator structure, the device of the invention functions to indicate the presence or absence, as the case may be, of particles of one predetermined energy level within the radiation environment.

By changing the parameters just mentioned, it is possible to select a new energy level which can be sensed by the device of the invention. Furthermore, if the resonator structure is made tunable, one can select different energy levels which can be sensed with a given resonator structure. The range of energy levels so sensed will be determined, of course, by the tuning range of the resonator structure. In the absence of said tuning means, a separate resonator structure would have to be incorporated into the equipment for each discrete energy level to be sensed. If the indicating device is made to discriminate between modes of operation of the resonator structure, energy levels corresponding to submultiples of the pi mode may be detected with the same resonator structure.

An object of this invention is to provide a radiation detecting means which can indicate the presence or absence of particles of high energy level in the radiation environment of a given energy level.

Other objects and features of the invention will more fully appear from the following description, and will be particularly pointed out in the claims.

Figure 1:
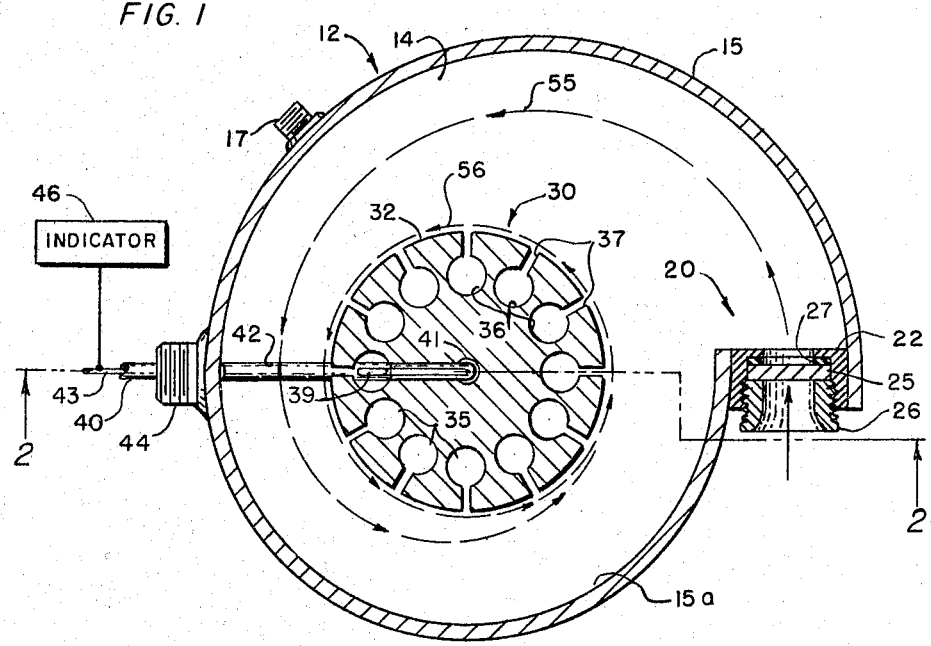
FIGURE 1 is a cross sectional view of a first embodiment of the invention taken along line 1—1 of FIGURE 2.
Figure 2:
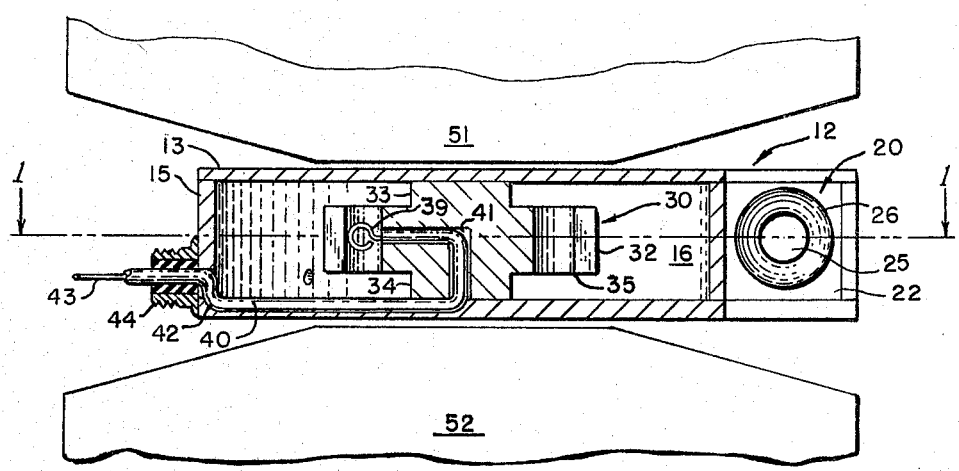
FIGURE 2 is a cross sectional view of the first embodiment taken along line 2—2 of FIGURE 1.

A first embodiment 10 of invention as shown in FIGURES 1 and 2 includes a hollow cylindrical casing 12 comprising two opposed flat discoidal plates 13 and 14 separated by a peripheral wall 15. The end plates 13 and 14 can be made of a magnetic material, such as iron, while the peripheral wall can be of non-magnetic material, such as brass or aluminum. The resulting cylindrical chamber 16 enclosed by said casing has an axial dimension or thickness small compared to the diameter. The device preferably is provided with a vacuum connection 17 for connection to a vacuum pump, not shown in the drawing. The chamber 16 is hermetically sealed and pumped to a high vacuum. The casing 12 is provided with a window assembly 20 extending into the peripheral wall 15 for receiving incident radiation from the radiation environment.

The window assembly 20 comprises an internally threaded bushing 22 affixed to wall 15 and inserted within an aperture in said wall. Bushing 22 includes a flange portion against which a window element 25 is removably held by an externally threaded retaining member 26. Retaining member 26 forces the window 25 against a gasket 27 to provide a hermetical seal. The window assembly permits interchange of windows 25 to provide for different stopping powers which may be necessary, for example, in the investigation of different types of radiation. The window element 25 may be made, for example, of polystyrene or a metal such as copper. In the example previously described, a copper window of one quarter centimeter thickness was assumed.

Inasmuch as the particles emanating from the window 25 obviously must not return to the windows, the window assembly 20 is offset slightly so that the radius of curvature of the peripheral wall 15 progressively increases over at least a portion of the periphery of the casing, as clearly indicated in FIGURE 1. The major portion 15a of the casing 12, however, has a circular periphery, with an axis coincident with the axis of the resonator structure 30 (about to be described). The greater the length of the circular portion 15a of the peripheral wall 15 obviously, the more rapidly the curvature must change in the non-circular portion of the peripheral wall 15 of the casing. Since the casing 12, and the chamber 16 bounded thereby, is substantially cylindrical, the center of the casing 12 (and chamber 16) and the axis passing through the center of casing 12 henceforth will be referred to in the specification and claims as the center and axis, respectively, of the major portion 15a of the casing 12 (or the portion of the chamber 16 bounded by the major portion 15a of the casing). The window assembly 20 is inserted in casing 12 in such a manner that the plane of the window 25 coincides substantially with a plane extending through the axis of the cylindrical chamber 16 (casing 12).

The cylindrical resonator structure 30 is disposed within the casing 12 near its center; the axis of the cylindrical resonator structure thus coincides with the axis of the chamber. With this arrangement, the magnetic force exerted on the particles emanating from the window acts in a direction perpendicular to the path of the charged particles and parallel to the plane passing through the center of the resonator; the particles thus traverse a path which always is referenced to the center of both the chamber 16 and the resonator structure 30. Resonator structure 30 comprises a cylindrical metallic block 32 having integral central projections 33 and 34 extending from opposite end faces of the block; these projections provide means for mounting the resonator structure 30 within the two end walls 13 and 14 of casing 12. The resonator structure 30 includes several cavity resonators 35 angularly disposed about the periphery of block 32. As shown in FIGURE 1, each of the cavity resonators 35 include a circular opening 36 communicating with the chamber by means of a radially disposed slot 37. This type of resonator structure is basically similar to the well known hole and the slot magnetron anode structure except that the radial slots are directed inwardly, in the case of the magnetron anode. It should be understood that the resonator structure may take other forms; for example, the cavity resonators may be bounded by radially disposed vanes.

Although not shown in FIGURES 1 and 2, it is possible to employ straps interconnecting alternating cavity resonator segments, in a manner well known to those skilled in the magnetron art. Such strapping may be useful in some applications to facilitate separation of the pi mode of operation from adjacent modes. By means of the central projections 33 and 34 of the block 32 the high frequency field developed within the cavity resonators 35 in consequence of passage of the orbiting particles past coupling slots 37 is spaced from the end walls 13 and 14 of the casing 12.

An even number of cavity resonators preferably is used; for example, as previously described, 12 uniformly spaced cavity resonators were considered; although 12 such cavity resonators are shown in FIGURE 1, the invention is not limited to this particular number. When the particle transit time between adjacent cavity resonator slots 37 approximates one half of the natural period of the cavity resonators, high frequency energy will be generated by the resonator structure 30. In the desired mode (pi mode) of operation, the individual cavity resonators 35 are effectively in parallel and energy can be extracted from any one of said resonators, as by a coupling loop 39 positioned in one of the cavity resonators. The coupling loop 39 is extended to form the inner conductor of the coaxial cable 40 which extends through a passage 41 in the resonator block 32 and thence along a receiving channel 42 in both end plate 14 and peripheral wall 15 to the inner pin 43 of a coaxial connector 44. A suitable indicator 46, such as a spectrum analyzer, cathode ray oscilloscope, or the like, is connected to the connector 44 for indicating the presence of energy generated within the resonator structure 30 and sensed by pick up loop 39.

The casing 12 is positioned between opposite pole pieces 51 and 52 of a magnet. Only the pole pieces of the magnet are shown in FIGURE 2. The entire magnet, for example, can be a C-shaped magnet structure having a coil wrapped about the body of the magnet structure. By passing a current from a variable power supply through the coil, the strength of the magnetic field can be varied. The magnetic field created by the aforesaid magnet is directed parallel to the axes of said resonator structure 30 and said chamber 16.

In the embodiment shown in FIGURES 1 and 2, the diameter of the resonator structure 30 is considerably smaller than the diameter of the casing 12. Since substantial energy interchange between the charged particles and the high frequency field along the resonator structure can be achieved only if the particles move very close to the coupling slots in the resonator structure 30, some means must be provided to move the charged particles entering the chamber 16 into an orbit very close to the resonator structure. In the device of FIGURES 1 and 2, this inward direction of the charged particles along the path 55, 56 is achieved by means of a magnet having tapered pole pieces 51 and 52, as clearly indicated in FIGURE 2. Since the field in the vicinity of the resonator structure 30 should be uniform to achieve orbiting of the electrons in the circular path 56 about the periphery of the resonator structure 30, the pole pieces have a flat central portion more or less juxtaposed with the resonator structure 30. The particles are directed from the window 25 along a spiral path 55 until the central region of the casing 12 is approached. By proper design of the tapered portion of the pole pieces, the particles can be made to spiral inwardly along path 55 until the particles reach the boundary of the uniform magnetic field at which region, the particles travel more or less tangentially to the desired orbit 56. The type of field necessary to achieve the composite particles trajectory 55, 56 can be produced, for example, by pole pieces of more or less frusto-conical configuration.

Figure 3:
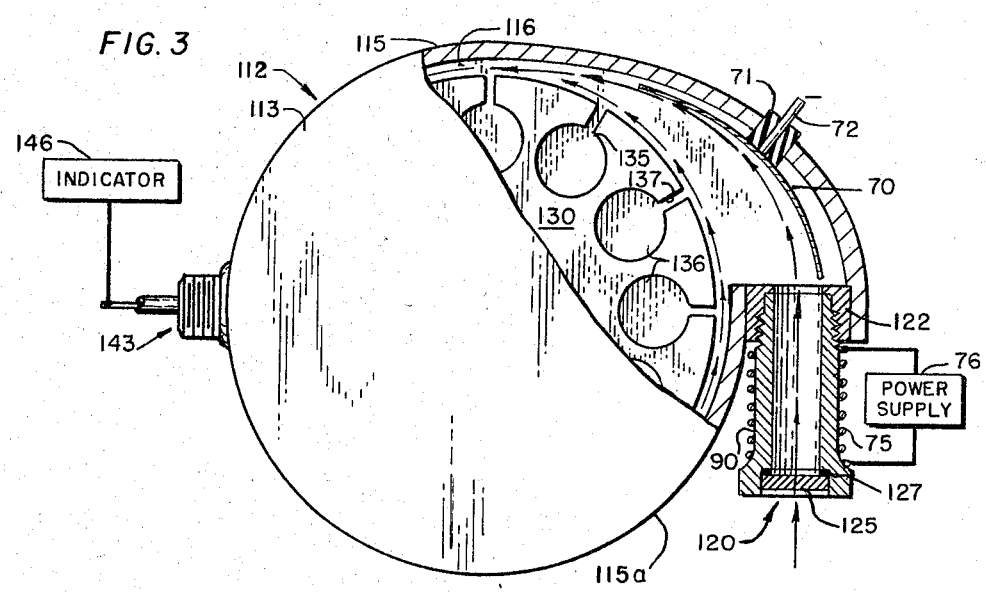
FIGURE 3 is a plan view, partly in section, of a second embodiment of the invention, also showing a second type of window assembly.
Figure 4:
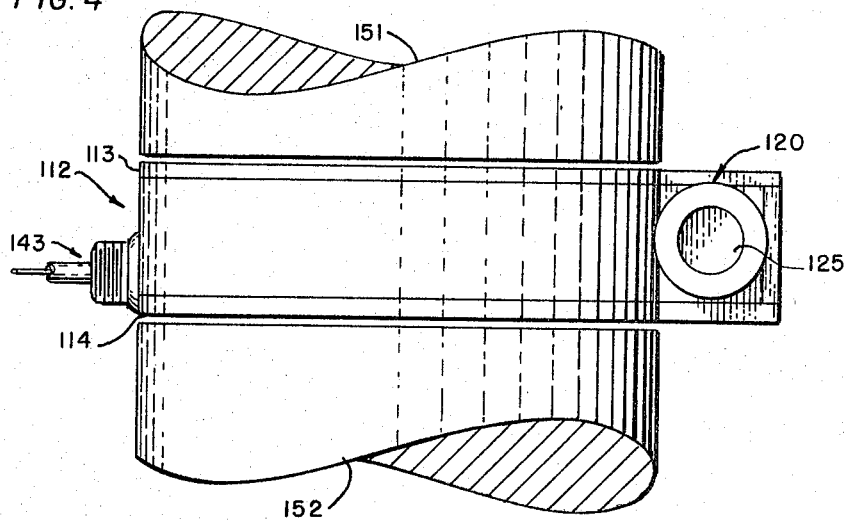
FIGURE 4 is a view in elevation of the second embodiment of the invention.

A second embodiment of the invention is shown in FIGURES 3 and 4 wherein elements identical to, or corresponding to, those in the device of FIGURES 1 and 2 are indicated by the same reference numeral increased by one hundred.

The device of FIGURES 3 and 4 includes a substantially cylindrical casing 112 including end plates or walls 113 and 114 and a peripheral wall 115, said casing forming a chamber 116 within which is positioned a cylindrical resonator structure 130. The latter includes a plurality of angularly disposed resonators 135, each of which is made up of an opening 136 and a coupling slot 137 extending radially from said opening 136 and opening into the chamber 116. The function of the resonator structure 130 is the same as that of resonator structure 30 in FIGURES 1 and 2. A window assembly 120 provides means through which particles from the radiation environment may be permitted to enter chamber 116 after being partially stopped by a window element 125 to reduce the incident energy by some preselected amount;

the amount of reduction of energy will depend upon the material and the thickness of window 125. The window assembly 120 is composed of a short section of tubing 90 having an externally threaded portion at the inner end threadedly engaging a gasket 122 mounted in the aperture in the casing 112. A coil 75 surrounding the tube 90 is supplied with electrical power from a source 76. The magnetic field produced by a flow of current through coil 75 will cause the particles emanating from window 125 to be collimated, that is, to assume a path along the longitudinal axis of tube 90; by means of this window assembly, the particles passing through the window can be injected into the chamber 116 substantially tangential to the peripheral wall.

In the device of FIGURES 3 and 4, the peripheral wall 115 of casing 112, like that of the device of FIGURES 1 and 2, includes a major portion of circular configuration, indicated in FIGURES 3 and 4 by the reference numeral 115a.

One of the basic differences between the device of FIGURES 3 and 4 and the device of FIGURES 1 and 2 is that the diameter of the resonator structure 130 is of the same order of magnitude as that of the casing 112, in contrast to the device of FIGURES 1 and 2, wherein the chamber of resonator structure 30 is considerably smaller than the diameter of the casing 12. This basic difference requires certain changes in construction of the device of FIGURES 3 and 4. First, an electrostatic deflection means comprising a curved deflecting electrode 70 is inserted within the chamber adjacent the point of entrance of the charged particle into the chamber. This electrode 70 is mounted by means of an electrically insulating bushing 71 and a support rod 72 to the peripheral wall of casing 112. If the charged particles entering the device are electrons a high negative potential is applied to the deflection electrode 70 by way of the support rod 72. If, on the other hand, the particles are protons, a positive potential would be applied to electrode 70. As explained previously in connection with the device of FIGURES 1 and 2, the presence of a window assembly makes it necessary to avoid having the particles strike the window assembly after emanating therefrom. The same considerations of eccentricity of curvature of the peripheral wall 115 apply as is the case of the peripheral wall 15 in a device of FIGURES 1 and 2. The purpose of the deflection electrode 70 is to direct the electrons inwardly into a region close to the periphery of the resonator structure 130, in which region a transverse magnetic field between pole pieces 151 and 152 will take over and act on the electrons. Thereafter under the influence of the magnetic field, the electrons will assume a circular orbit about the periphery of the resonator structure, as shown in FIGURE 3. Since the electrons come within the influence of the magnetic field after having been deflected by the deflection electrode 70 to a region close to the periphery of the resonator structure 130, it is now evident that the magnetic field between pole pieces 151 and 152 will be a uniform field which is provided by flat pole pieces.

As in the previous device, the particle orbiting about the periphery of the resonator structure 130 will, if the design parameters previously discussed are properly selected, generate high frequency energy within the cavity resonators 135 and this energy, if present, can be detected by means of the indicator 146 connected to connector 143. As in the case of the device in FIGURE 1 and 2, an indication of energy on indicator 146 will indicate that particles of a preselected energy level from the radiation environment are present.

This invention is not limited to the particular details of construction, materials and processes desired, as many equivalence will suggest themselves to those skilled in the art. For example, it should be understood that the collimating window shown in the device of FIGURES 3 and 4 can be used in the device of FIGURES 1 and 2. Furthermore, if the particles being injected into the chamber of either of the devices shown were protons, rather than electrons, the magnetic field would be reversed. It is desired, accordingly, that the appended claims be given a broad interpretation commenserate with the scope of the invention within the art.

What is claimed is:

1. A device for detecting high energy particles of a preselected energy level within a radiation environment comprising an evacuated casing forming a cylindrical chamber and having opposed spaced discoidal walls with a peripheral arcuate wall therebetween, a portion of said peripheral wall containing means including a window capable of absorbing radiation incident thereupon and interacting with said radiation to introduce high energy charged particles into said chamber near said peripheral wall of energy level differing from said preselected energy level by a known amount dependent upon the material and thickness of said window, a cylindrical resonator structure positioned within said chamber, said resonator structure having an axis coincident with the axis of the chamber, said resonator structure including a plurality of angularly disposed cavity resonators opening outwardly into said chamber, means for producing a magnetic field within said chamber directed parallel to said coincident axes and substantially normal to the direction in which the charged particles are introduced into said chamber, said magnetic field in the region of said resonator structure being of uniform strength, said particles traversing a circular orbit adjacent the periphery of said resonator structure under the influence of said uniform magnetic field, those of said orbiting particles of said predetermined energy level interacting with the high frequency electrical field existing along said resonator structure to generate oscillatory energy within said cavity resonators, and indicating means coupled to said resonator structure for indicating the presence of said oscillatory energy and consequently the presence of particles of said predetermined energy level.

2. A device according to claim 1 wherein the plane of said window substantially coincides with a plane extending through the axis of said resonator structure.

3. A device according to claim 1 wherein said window includes a tubular channel extending substantially tangentially to the peripheral wall of said casing.

4. A device according to claim 3 further including a coil surrounding said tubular channel and means for energizing said coil to collimate particles entering said chamber.

5. A device for detecting high energy particles of a predetermined energy level within a radiation environment comprising an evacuated casing forming a cylindrical chamber and having opposed spaced discoidal walls with a peripheral arcuate wall therebetween, a portion of said peripheral wall containing means capable of absorbing radiation incident thereupon and interacting with said radiation to introduce high energy charged particles into said chamber near said peripheral wall, a cylindrical resonator structure positioned within said chamber, said resonator structure having an axis coincident with the axis of the chamber, said resonator structure including a plurality of angularly disposed cavity resonators opening outwardly into said chamber, the diameter of said resonator structure being slightly smaller than the diameter of said casing, means for producing a magnetic field within said chamber directed parallel to said coincident axes and substantially normal to the direction in which the charged particles are introduced into said chamber, said magnetic field being of uniform strength, said particles traversing a circular orbit adjacent the periphery of said resonator structure under the influence of said uniform magnetic field, those of said orbiting particles of said predetermined energy level interacting with the high frequency electrical field existing along said resonator structure to generate oscillatory energy within said cavity resonators, and indicating means coupled to said resonator structure for indicating the presence of said oscillatory energy.

6. A device according to claim 5 further including an electrostatic deflection means disposed adjacent said window for directing said charged particles emanating from said window radially inwardly into a region adjacent the periphery of said resonator structure.

7. A device for detecting high energy particles of a predetermined energy level within a radiation environment comprising an evacuated casing forming a cylindrical chamber and having opposed spaced discoidal walls with a peripheral arcuate wall therebetween, a portion of said peripheral wall containing means capable of absorbing radiation incident thereupon and interacting with said radiation to introduce high energy charged particles into said chamber near said peripheral wall, a cylindrical resonator structure positioned within said chamber, said resonator structure having an axis coincident with the axis of the chamber, said resonator structure including a plurality of angularly disposed cavity resonators opening outwardly into said chamber, the diameter of said resonator structure being substantially smaller than the diameter of said casing, means for producing a magnetic field within said chamber directed parallel to said coincident axes and substantially normal to the direction in which the charged particles are introduced into said chamber, a first portion of said magnetic field being of progressively increasing strength from a region adjacent said peripheral wall to a central region substantially coextensive with said resonator structure, said charged particles under the influence of said first portion of said magnetic field traversing a spiral path within said chamber until said central region is reached, a second portion of said magnetic field in the central region of said chamber being of uniform strength, said particles traversing a circular orbit adjacent the periphery of said resonator structure under the influence of said second portion of said magnetic field, those of said orbiting particles of said predetermined energy level interacting with the high frequency electrical field existing along said resonator structure to generate oscillatory energy within the said cavity resonators, and indicating means coupled to said resonator structure for indicating the presence of said oscillatory energy.

References Cited by the Examiner

UNITED STATES PATENTS

| | | | |
|---|---|---|---|
| 2,422,264 | 6/1947 | Seaman | 250—41.9 |
| 2,528,541 | 11/1950 | Pajes et al. | 315—39.67 |
| 2,681,416 | 6/1954 | Thompson | 313—61 |
| 2,709,750 | 5/1955 | Smith | 250—41.9 |
| 2,724,056 | 11/1955 | Slepian | 250—41.9 |
| 2,806,161 | 9/1957 | Foster | 250—41.9 |
| 2,845,539 | 7/1958 | Robinson | 250—41.9 |
| 3,052,797 | 9/1962 | Kronenberg | 313—61 |

RALPH G. NILSON, *Primary Examiner.*

W. F. LINDQUIST, *Assistant Examiner.*